(12) United States Patent
Eybergen et al.

(10) Patent No.: US 7,722,312 B2
(45) Date of Patent: May 25, 2010

(54) FUEL CELL COMPRESSOR SYSTEM

(75) Inventors: William Nicholas Eybergen, Windsor (CA); Martin Dale Pryor, Canton, MI (US); James Matthew Brown, Allen Park, MI (US)

(73) Assignee: Eaton Corporation, Cleveland, OH (US)

( * ) Notice: Subject to any disclaimer, the term of this patent is extended or adjusted under 35 U.S.C. 154(b) by 575 days.

(21) Appl. No.: 11/609,650

(22) Filed: Dec. 12, 2006

(65) Prior Publication Data
US 2007/0134111 A1 Jun. 14, 2007

Related U.S. Application Data

(60) Provisional application No. 60/750,225, filed on Dec. 14, 2005.

(51) Int. Cl.
*F01D 15/12* (2006.01)
(52) U.S. Cl. .................. 415/69; 415/123; 415/124.1; 416/124; 416/170 R; 416/198 A
(58) Field of Classification Search ............. 415/65, 415/66, 68, 69, 122.1, 123, 124.1; 416/124, 416/126, 170 R, 198 R, 198 A; 475/331
See application file for complete search history.

(56) References Cited

U.S. PATENT DOCUMENTS

| | | | | | |
|---|---|---|---|---|---|
| 2,375,085 | A | * | 5/1945 | Curtis | 415/168.2 |
| 2,449,930 | A | * | 9/1948 | Davey | 92/155 |
| 3,511,513 | A | * | 5/1970 | Dahlheimer | 277/353 |
| 4,231,702 | A | | 11/1980 | Gopalakrishnan et al. | |
| RE31,259 | E | | 5/1983 | Gopalakrishnan et al. | |
| 4,964,315 | A | * | 10/1990 | Willis, Jr. | 74/665 GA |
| 6,142,747 | A | * | 11/2000 | Rosenau et al. | 417/251 |
| 6,920,754 | B2 | | 7/2005 | Arnold et al. | |
| 7,013,879 | B2 | | 3/2006 | Brookshire et al. | |
| 7,014,418 | B1 | | 3/2006 | Arnold et al. | |
| 2004/0179947 | A1 | | 9/2004 | Agrawal et al. | |
| 2005/0261141 | A1 | | 11/2005 | Iso et al. | |
| 2006/0263203 | A1 | * | 11/2006 | Barker | 415/122.1 |

FOREIGN PATENT DOCUMENTS

| | | |
|---|---|---|
| EP | 0301285 A1 | 2/1989 |
| EP | 0878859 A1 | 11/1998 |
| WO | 03040567 A1 | 5/2003 |
| WO | 2005043659 A2 | 5/2005 |

* cited by examiner

*Primary Examiner*—Edward Look
*Assistant Examiner*—Ryan H Ellis
(74) *Attorney, Agent, or Firm*—Dykema Gossett PLLC

(57) ABSTRACT

The invention provides a fuel cell compressor system that comprises a motor, including a motor shaft driven by the motor; a drive housing at least partially surrounding the motor shaft; a first gear set driven by the motor shaft; a carrier torque tube driven by the first gear set; and an impeller. The impeller includes an impeller shaft driven by the second gear set, so that the impeller shaft is configured to rotate at a speed greater than motor speed. Embodiments of the invention may also be used with a multi-stage compressor that allows, for example, first and second impellers to rotate at different speeds. Embodiments of the invention may also include removal of a gear set driving the carrier torque tube or the impeller shaft, so that the impeller shaft speed is divided between one or more bearings supporting the carrier torque tube and one or more bearings supporting the impeller shaft.

15 Claims, 5 Drawing Sheets

FUEL CELL COMPRESSOR SYSTEM

RELATED APPLICATIONS

This application claims the benefit of U.S. Provisional Patent Application No. 60/750,225 filed Dec. 14, 2005, hereby incorporated by reference in its entirety.

BACKGROUND OF INVENTION a. Field of Invention

The invention relates generally to a fuel cell compressor system, including a fuel cell compressor system that uses a gear set configured to drive an impeller at a speed greater than motor speed.

b. Description of Related Art

Fuel cells generally require clean, pressurized fluid to operate reliably. Centrifugal compressors designed for low flow, operate more efficiently at higher speeds. Accordingly, conventional centrifugal fuel cell compressors are typically directly driven by high-speed motors. However, the use of high-speed motors can involve some disadvantages. Among other things, sealed, greased bearings are commonly unable to adequately operate at such higher motor speeds. Also, while open oil bearings may operate at higher compressor speeds, their use requires inefficient, complex, oil lubrication systems to survive. Further, while air bearings can sometimes be used in higher-speed environments, and operate cleanly, such bearings are often expensive and impractical for mass production.

Consequently, there is a desire for a fuel cell compressor system that can operate with a low-speed motor, while retaining a sufficiently high compressor speed for efficient, reliable fuel cell operation. Further, there is a desire for a fuel cell compressor system that may be configured for operation with standard mass produced bearings that are otherwise typically not usable in connection with high-speed compressor operation.

SUMMARY OF INVENTION

In an embodiment, the invention provides a fuel cell compressor system that comprises a motor, including a motor shaft driven by the motor; a drive housing at least partially surrounding the motor shaft; a first gear set driven by the motor shaft; a carrier torque tube driven by the first gear set; and an impeller. The impeller includes an impeller shaft driven by the second gear set, so that the impeller shaft is configured so as to be capable of rotating (or spinning) at a speed (i.e., rotational speed) that is greater than motor speed. Embodiments of the invention may also be used with a multi-stage compressor that allows, for example, first and second impellers to rotate at different speeds.

Various features of this invention will become apparent to those skilled in the art from the following detailed description, which illustrates embodiments and features of this invention by way of non-limiting example.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as embodied in or defined by the appended claims.

Figure 1:
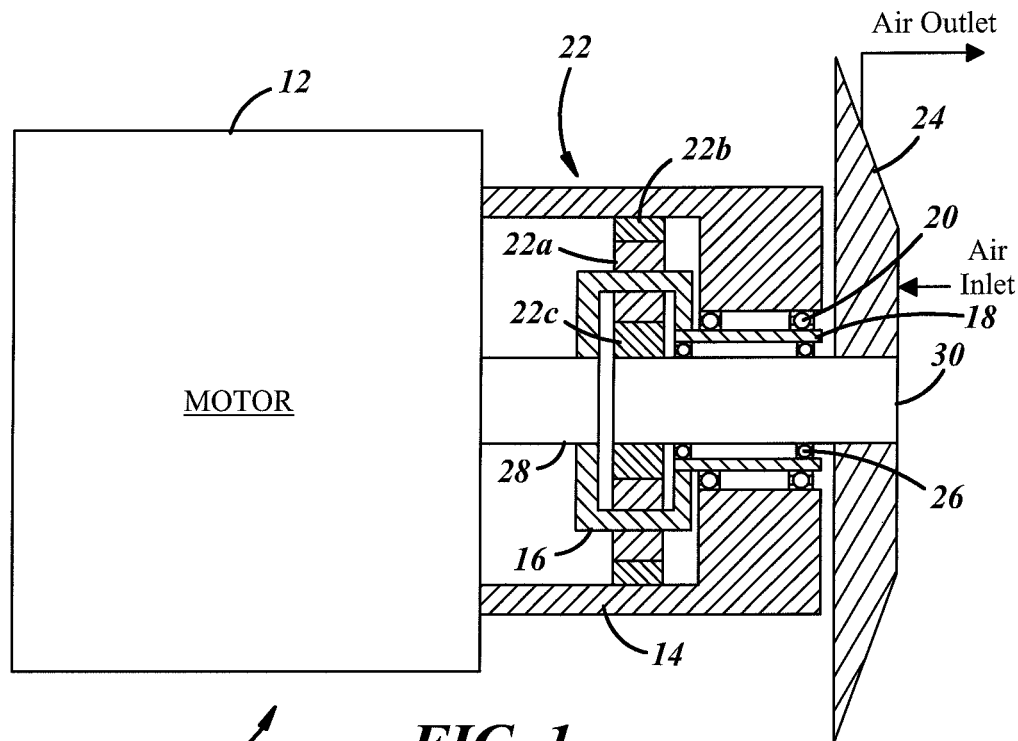
FIG. 1 is a cross-sectional view of a fuel cell compressor system in accordance with an embodiment of the present invention.

FIG. 1 generally illustrates a cross-sectional view of a fuel cell compressor system 10 in accordance with an embodiment of the invention. The illustrated system 10 is shown including a motor 12, a drive housing 14, a first gear set 16, carrier torque tube 18, first bearing 20, a second gear set 22, impeller 24, and a second bearing 26. Embodiments of the system, of the type shown in FIG. 1, are sometimes referred to as "single-stage" compressor systems.

In the illustrated embodiment, motor 12 is shown connected to or including a motor shaft 28. Motor 12 may comprise an electric motor that is provided to drive shaft 28. Further, one or more bearings (not shown) may be disposed within or about motor 12 for accommodating rotational movement of shaft 28. As illustrated, shaft 28 may extend in a generally axial direction. In an embodiment, motor 12 may comprise a low-speed motor, although a high compressor speed may still be maintained through use of the system. A low speed motor may be considered to have a maximum operating speed of no more than about 25,000 rpm.

A drive housing 14 can be provided to house one or more gear sets of system 10 when gear sets are used in place of a direct drive system. Drive housing 14 at least partially surrounds motor shaft 28 and, in embodiments, one or more housing components may be configured to substantially enclose the entire motor shaft 28.

Figure 2:
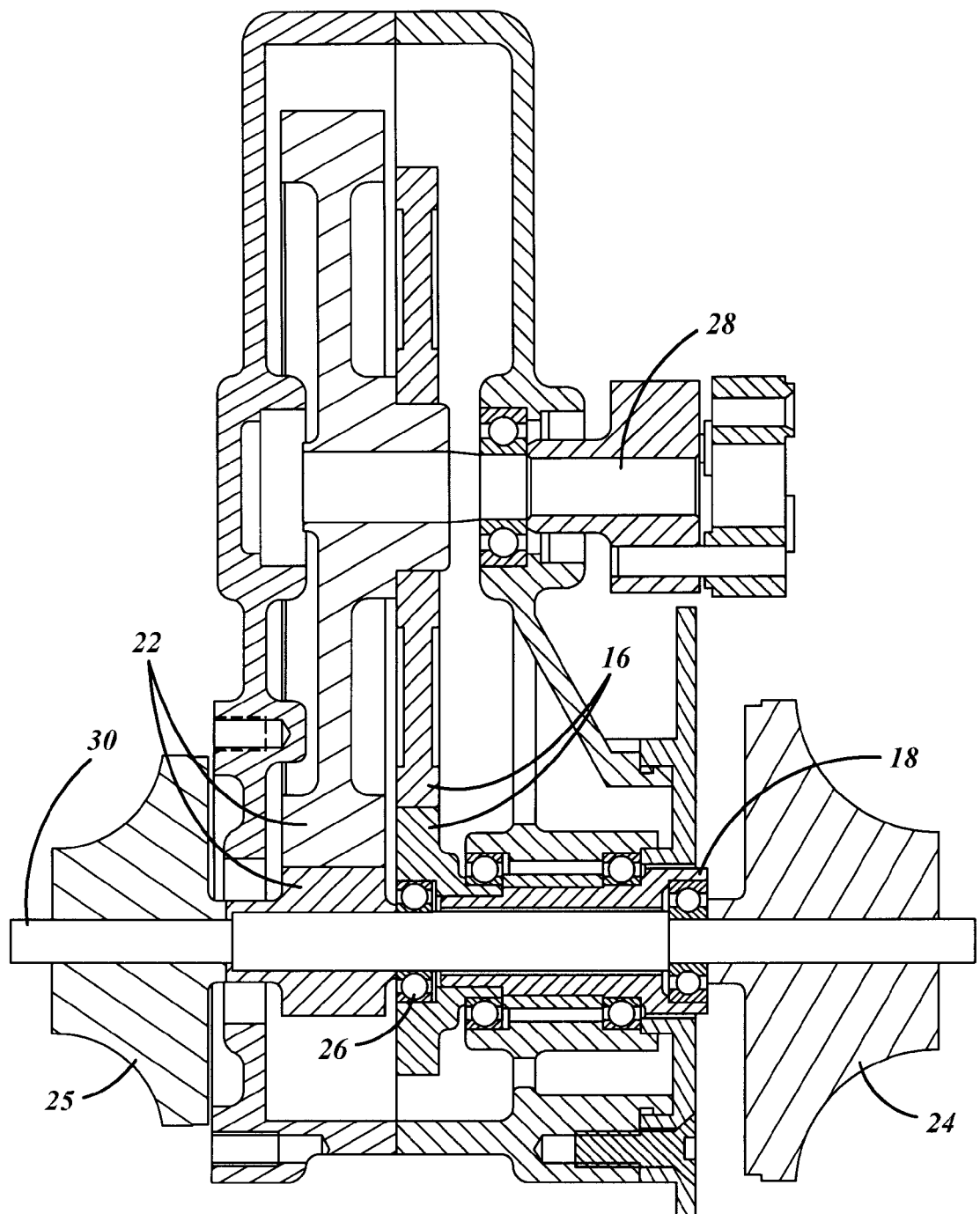
FIG. 2 is a partial cross-sectional view of a fuel cell compressor system in accordance with another embodiment of the present invention.

First gear set 16 is driven by motor shaft 28 and is configured to drive carrier torque tube 18. In an embodiment, first gear set 16 may comprise a planet gear carrier, for example as generally illustrated in FIG. 1, such that motor shaft 28 is configured to drive a planet gear carrier. In another embodiment, first gear set 16 may comprise one or more spur gears, for example as generally illustrated in FIG. 2, such that motor shaft 28 is configured to drive a spur gear.

A carrier torque tube 18 can be provided to, among other things, at least partially support motor shaft 28. The carrier torque tube 18 can be configured to be driven by first gear set 16. In some embodiments, such as generally shown in FIG. 1, carrier torque tube 18 may be connected or attached directly to first gear set 16, which may comprise a planet gear carrier. In another embodiment, carrier torque tube 18 may be configured to be driven by a spur gear. In embodiments, the carrier torque tube 18 can be configured to rotate at a first (i.e., rotational) speed, which may be or correspond to motor speed.

A first bearing 20 or a plurality of bearings may be provided to generally support carrier torque tube 18. In an embodiment, two bearings may be provided to generally support carrier torque tube 18, although fewer or additional bearings may be provided and remain within the spirit and scope of the invention. In the illustrated embodiment, first bearing 20 is disposed between carrier torque tube 18 and drive housing 14. The first bearing 20 may also rotate at a first speed, like the carrier torque tube 18. In an embodiment, such first speed may be or correspond to motor speed. For some embodiments, first bearing 20 may comprise a sealed greased bearing.

A second gear set 22 may be configured to be driven by the motor shaft and may be configured to drive impeller 24. In an embodiment, second gear set 22 may comprise a planet gear 22a, a ring gear 22b, and a sun gear 22c. An example of such an embodiment is generally shown in FIG. 1. In the illustrated embodiment motor shaft 28 is configured to drive a planet gear carrier. Ring gear 22b, which is fixed to drive housing 14, permits sun gear 22c to be driven faster than motor shaft 28. In another embodiment, such as generally illustrated in FIG. 2, second gear set 22 may comprise one or more helical gears or spur gears. Gear set 22 is configured to drive impeller 24. In such an embodiment, the imposed axial force from the helical gear or spur gear of second gear set 22 can oppose the natural axial force applied from impeller 24—due at least in part to the pressure difference between the front and rear side of impeller 24. Accordingly, the axial forces from the second gear set 22 and from the impeller 24 can be used to help balance each other, which can reduce the loads on second bearing 26 and help to improve the lifespan of second bearing 26.

Figure 3:
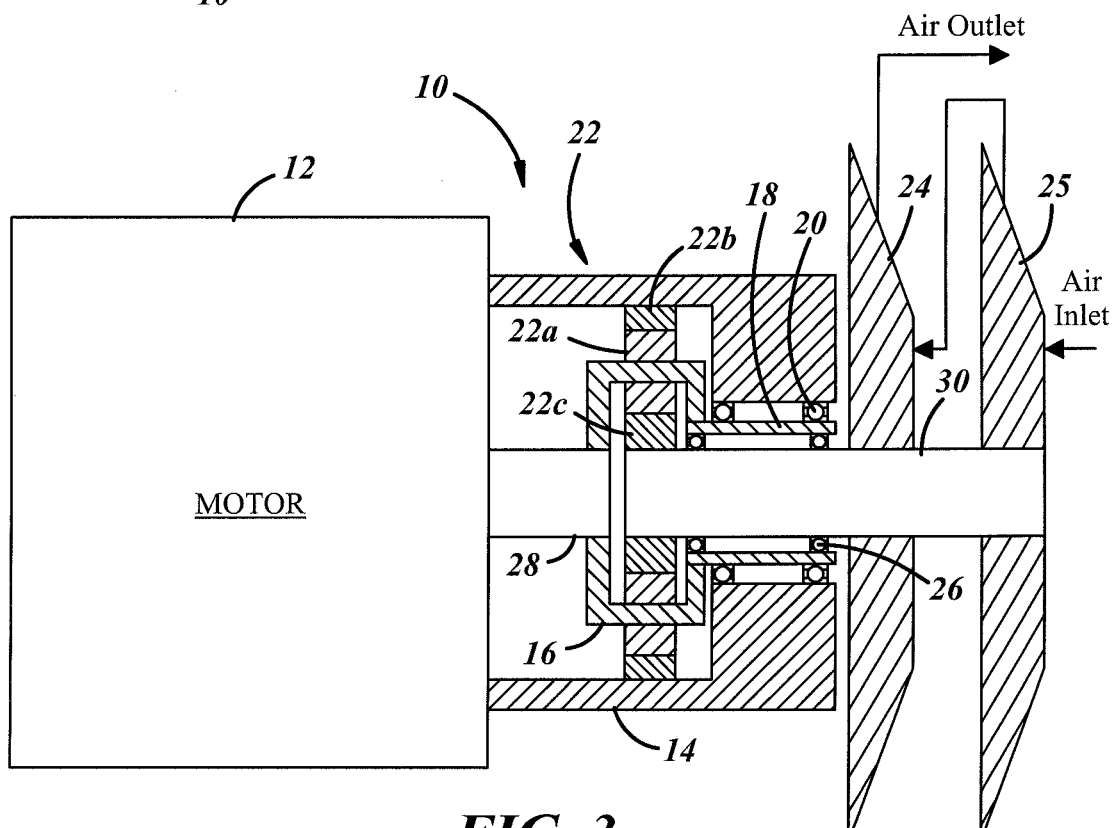
FIG. 3 is a cross-sectional view of a fuel cell compressor system in accordance with another embodiment of the present invention.

The impeller 24 may rotate within a compressor to pressurize a fluid that is flowing through system 10. The compressor may be connected to motor 12 through any coupling or other methodology that is conventional in the art. Only one impeller 24 is typically provided in a single-stage compressor such as that generally illustrated in FIG. 1. However, as generally illustrated in FIG. 3, more than one impeller 24, 25 may be provided in connection with multi-stage compressor systems. With a multi-stage compressor, fluid can be compressed to a first pressure in a first stage and then further compressed to a higher pressure in a second sequential stage. Referring again to FIG. 1, impeller 24 is generally at least partially surrounded by a housing (not shown). Impeller 24 includes or is connected to an impeller shaft 30. Impeller shaft 30 is configured to be driven by second gear set 22. In an embodiment, such as generally shown in FIG. 1, impeller shaft 30 may be driven by a sun gear 22c. Accordingly, impeller shaft 30 may be configured to rotate at a second speed. This second speed may be greater than motor speed. In another embodiment, impeller shaft 30 may be configured to be driven by helical gears or spur gears. In the latter embodiment, impeller shaft 30 may still be configured to rotate at a second speed that may be greater than motor speed. Because impeller 24 (e.g., as shown in FIG. 1) or impellers 24, 25 (e.g., as shown in FIG. 3) may be connected or attached to impeller shaft 30, impellers 24 and 25 may both rotate at the speed of impeller shaft 30.

A second bearing 26 or a plurality of bearings can be provided to, among other things, at least partially support impeller shaft 30. In an embodiment, two bearings may be provided to generally support carrier torque tube 18, although fewer or additional bearings may be provided and remain within the spirit and scope of the invention. In the illustrated embodiment, second bearing 26 is disposed between impeller shaft 30 and carrier torque tube 18. With embodiments of the invention, second bearing 26 may rotate at the difference between motor speed and impeller shaft speed. This difference may be dependent upon the gear ratio of the second gear set 22, such as the gear ratio of the planetary system in FIG. 1. For some embodiments, the second bearing 26 may comprise a sealed greased bearing. In an embodiment as shown in FIG. 2, bearing losses may be mitigated through a feedback loop through gear set 16. In particular, a torque path may be created through gear set 22 and through bearing 26. Losses associated with bearing 26 may cause a force that is applied to gear set 16 which may feed back into shaft 28, thereby regaining some of the energy otherwise lost.

Figure 2A:
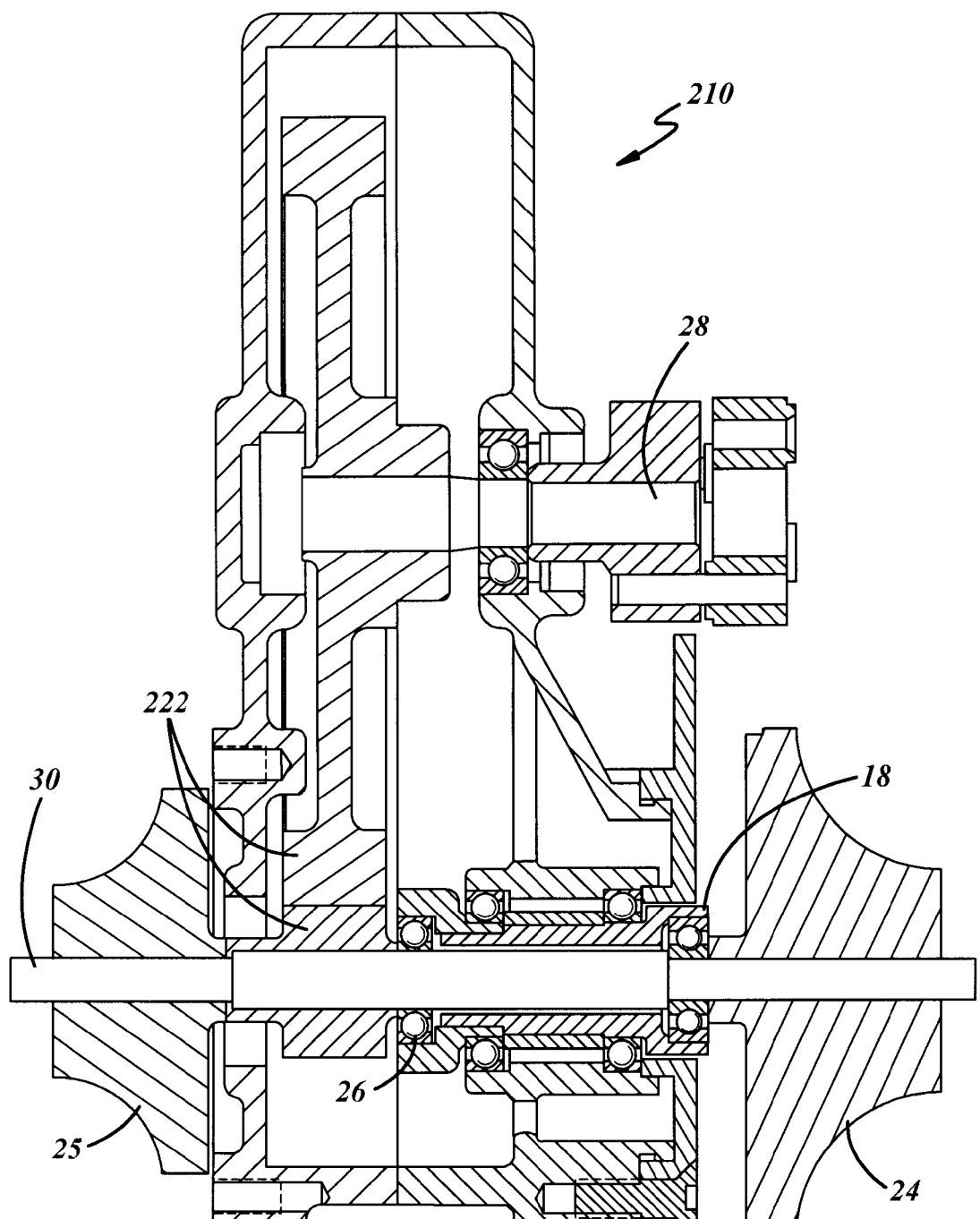
FIG. 2A is a partial cross-sectional view of a fuel cell compressor system in accordance with another embodiment of the present invention.

Referring to FIG. 2A, another embodiment of a fuel cell compressor system 210 in accordance with the principles of the invention is illustrated. Illustrated system 210 is substantially similar to previously illustrated system 10, but includes modification to, among other things, remove the gear set driving carrier torque tube 18. As generally illustrated in the embodiment shown in FIG. 2A, system 210 includes a gear set 222 that may drive impeller shaft 30. Bearing 26 for supporting impeller shaft 30 may have some inherent drag that may result in a force at the outer race of bearing 26 which may then be exerted on carrier torque tube 18. Carrier torque tube 18 is supported at least in part, by bearing 20 that enables rotation of carrier torque tube 18. Although no gear set is used to drive carrier torque tube 18, the force exerted on carrier torque tube 18 from the shaft bearing 26 running drag may cause carrier torque tube 18 to rotate. The total impeller shaft 30 speed may be divided between bearing 26 supporting impeller shaft 30 and bearing 20 supporting carrier torque tube 18, which may prevent bearings 20, 26 from overspeeding. For some embodiments, bearings 20, 26 may comprise sealed greased bearings.

Figure 2B:
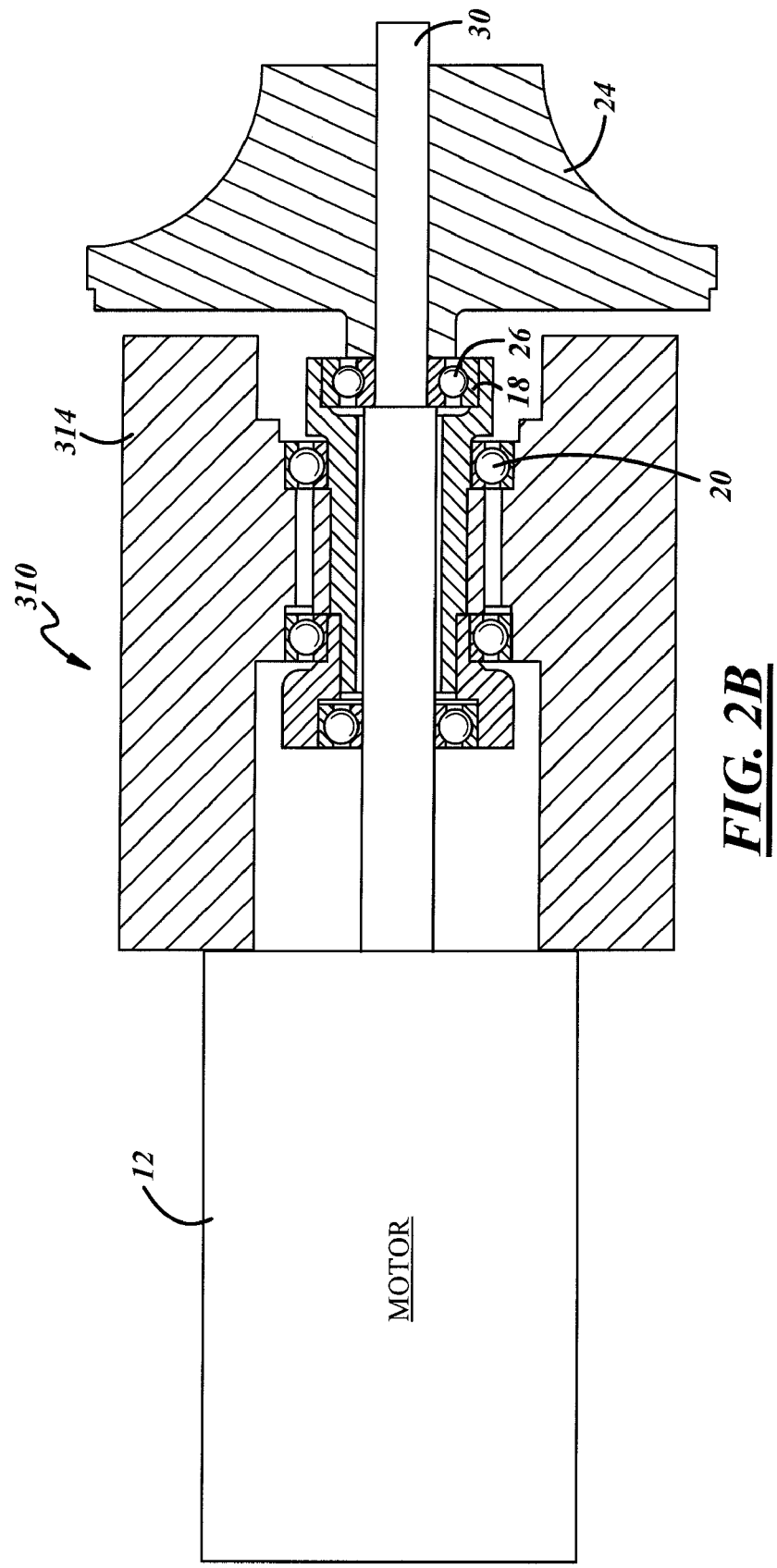
FIG. 2B is a partial cross-sectional view of a fuel cell compressor system in accordance with another embodiment of the present invention.

Referring to FIG. 2B, another embodiment of a fuel cell compressor system 310 in accordance with the principles of the invention is illustrated. Illustrated system 310 is substantially similar to previously illustrated system 210, but includes modification to, among other things, remove the gear set driving impeller shaft 30. As generally illustrated in the embodiment shown in FIG. 2B, system 310 includes impeller shaft 30 that is direct driven by motor 12. Motor 12 may comprise either a low-speed motor (e.g., a motor with maximum operating speed of no more than about 25,000 rpm) or a high-speed motor (e.g., a motor with operating speed greater than about 25,000 rpm, and in one embodiment with operating speed of about 60,000 rpm to about 100,000 rpm). Bearing 26 may support impeller shaft 30 and may be mounted to carrier torque tube 18. Carrier torque tube 18 may be supported at least in part, by bearing 20 that may be mounted to the compressor housing 314. Bearing 26 for supporting impeller shaft 30 may have some inherent drag that may result in a force at the outer race of bearing 26 which may then be exerted on carrier torque tube 18. The force exerted on carrier torque tube 18 from the shaft bearing 26 running drag may cause carrier torque tube 18 to rotate. The total impeller shaft 30 speed may be divided between bearing 26 supporting impeller shaft 30 and bearing 20 supporting carrier torque tube 18, which may prevent bearings 20, 26 from overspeeding. For some embodiments, bearings 20, 26 may comprise sealed greased bearings.

Figure 4:
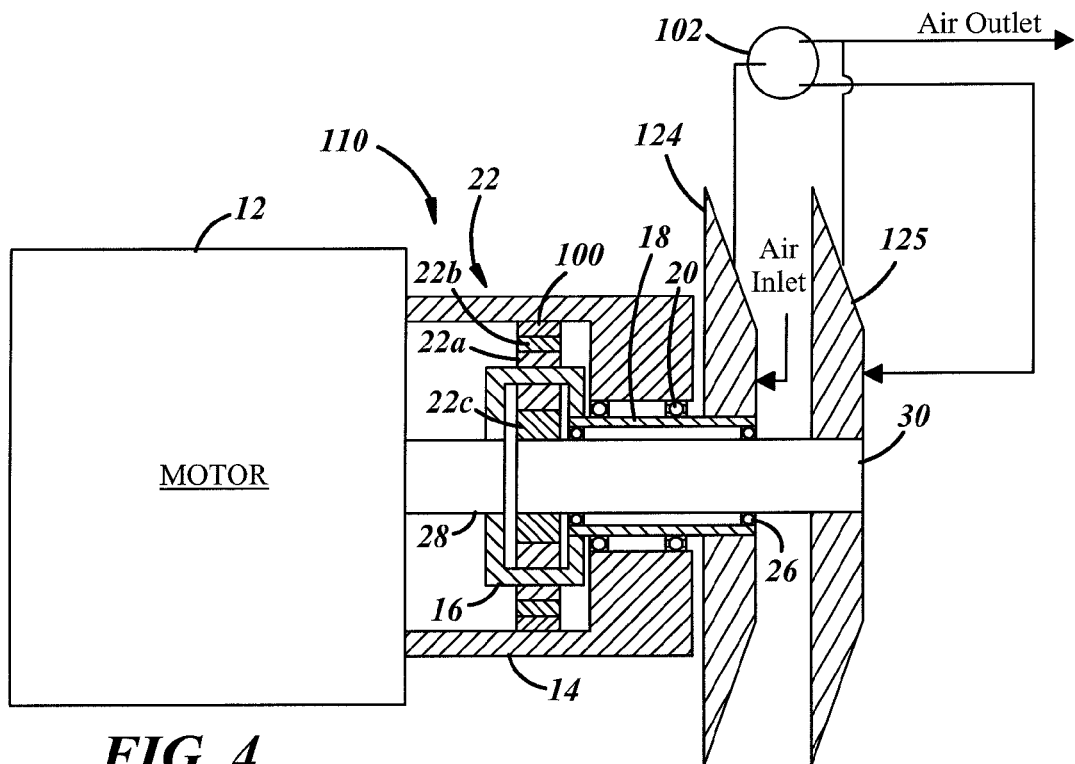
FIG. 4 is a cross-sectional view of a fuel cell compressor system in accordance with another embodiment of the present invention.

Referring to FIG. 4, another embodiment of a fuel cell compressor system 110 in accordance with principles of the invention is illustrated. Illustrated system 110 is substantially similar to previously-illustrated system 10, but includes modifications to, among other things, allow for a multi-stage compressor with two impellers that can operate at different speeds. As generally illustrated in the embodiment shown in FIG. 4, system 110 may comprise a first impeller 124 and a second impeller 125. First impeller 124 can be configured for rotation within a compressor to pressurize a fluid that is flowing through a first stage of system 110. First impeller 124 may be connected or attached to carrier torque tube 18. Accordingly, first impeller 124 may rotate at a first speed that corresponds to or is the same as that of carrier torque tube 18. In an embodiment, carrier torque tube and first impeller 124 may rotate at or correspond to motor speed.

Second impeller 125 can be configured for rotation within a compressor to further pressurize a fluid that is flowing through a second stage of system 110. Second impeller 125 may be connected or attached to impeller shaft 30. Impeller shaft 30 can be configured to be driven by the second gear set 22. As generally illustrated in connection with the embodiment shown in FIG. 4, impeller shaft 30 may be configured to be driven by a sun gear 22c. Accordingly, impeller shaft 30 may be configured to rotate at second speed. Second impeller 125 may rotate at a second speed that is the same as that of impeller shaft 30. In an embodiment, impeller shaft 30 and second impeller 125 may be configured to rotate at a speed greater than motor speed. The second speed may be greater than the first speed at which first impeller 124 rotates. Accordingly, first impeller 124 and second impeller 125 can be configured so as to be able to operate at different speeds in system 110, which can provide more flexibility with respect to fluid delivery.

In an embodiment, system 110 may further include a clutch 100. Clutch 100 can be provided and configured to permit ring gear 22b to slip, and/or controllably slip, so that the power delivered to second impeller 125 may be modified for changed fluid flow. Clutch 100 may, for example, be disposed between drive housing 14 and ring gear 22b of second gear set 22. As illustrated, ring gear 22b may be disposed between impeller shaft 30 and drive housing 14. Moreover, in an embodiment, system 110 may further include a diverter, such as diverter valve 102. A diverter valve 102 may be configured and provided to permit fluid to bypass a second stage of system 110. Disengaging and bypassing the second stage of system 110 may provide for more efficient operation of system 110, for example, when full compressor output may not be desired or required.

Figure 5:
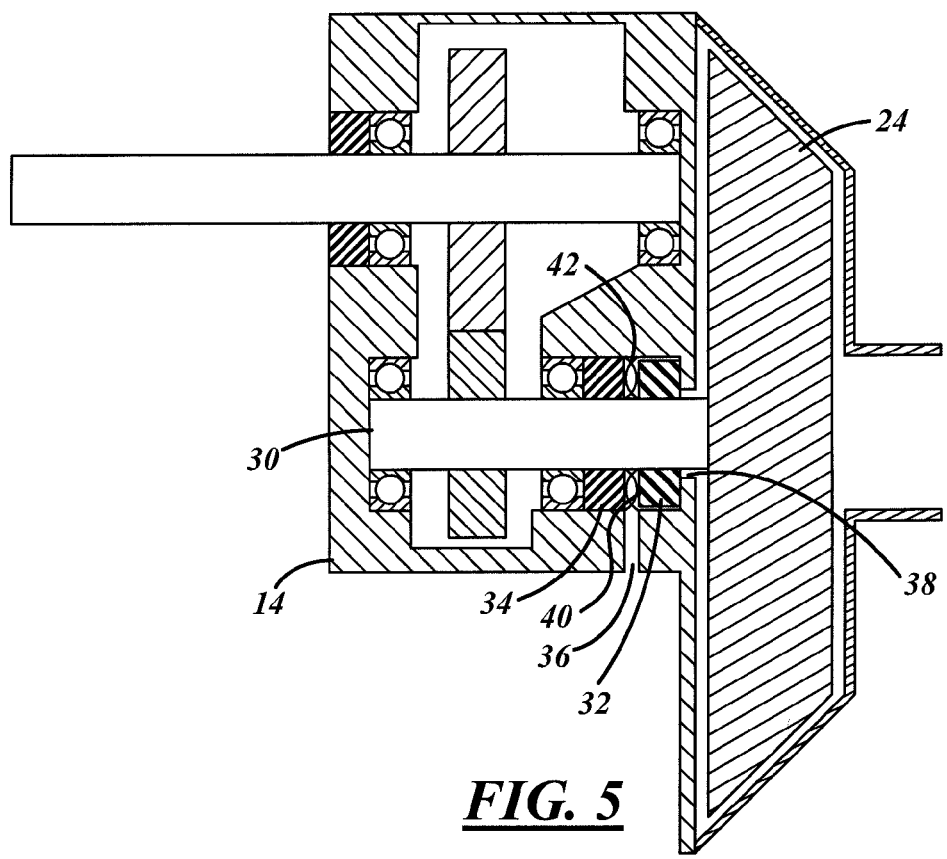
FIG. 5 is a cross-sectional view of a seal system for a fuel cell compressor system in accordance with another embodiment of the present invention.

Embodiment of the systems, such as illustrated systems 10 and 110, may further include a seal system for reducing or preventing contamination of fluid in the system. A seal system may be provided to, among other things, reduce or eliminate contamination of the fluid in systems by oil that may be used to lubricate gears associated with embodiments of the system. Referring to FIG. 5, the seal system may include, by way of example and without limitation, a first seal 32, a second seal 34, and a drain 36.

As generally shown in the illustrated embodiment, a first seal 32 may be provided to prevent contaminants, such as oil from migrating from drive housing 14 to the compressor. Such a first seal 32 may include a bore that is closely toleranced to match or correspond to the impeller shaft 30. In other words, for some embodiments a small running clearance may be provided between first seal 32 and shaft 30. First seal 32 may, for instance, be disposed around impeller shaft 30 proximate impeller 24 or 124. A first side 38 of first seal 32 can be pressurized to the compressor pressure, while a second side 40 of first seal 32 can be vented to atmosphere, thereby creating a pressure gradient. Such a pressure gradient may be used to help prevent contaminants, such as oil, from migrating past first seal 32 and may also prevent air leaks, which would decrease the efficiency of systems 10 and 110. First seal 32 may comprise any dimensionally stable material suitable for such an environment. In an embodiment, first seal 32 may comprise, for example, phenolics, ceramic, glass, or silicon nitride. Although these materials may be described in some detail or with some specificity, it is understood by those of ordinary skill in the art that numerous other materials may be used for first seal 32 and remain within the spirit and scope of the invention.

In an embodiment, a second seal 34 may be provided as part of a double-seal arrangement for the seal system. As generally illustrated, second seal 34 may be included and disposed around impeller shaft 30 between first seal 32 and the gear system. The second seal 34 may comprise a rubber. Although rubber is specifically noted, it is understood by those of ordinary skill in the art that numerous other materials may be used for second seal 34 and remain within the spirit and scope of the invention.

As further generally shown in the illustrated embodiment, a drain 36 may be included and disposed in drive housing 14 between first seal 32 and second seal 34. The drain 36 may be used for draining contaminants from the system. In an embodiment, drain 36 may drain leaked oil outside the seal system so that it does not contaminate fluid within the system.

The seal system may further include a device or means for forcing at least a portion of first seal 32 against drive housing 14. For example, as generally illustrated in the depicted embodiment, a wave spring 42 may be provided to force at least a portion of first seal 32 against drive housing 14. The use of such a device or means may help prevent oil migration around the outside of first seal 32 and may prevent rotation of the first seal 32. Each of the embodiments illustrated in FIGS. 1-4 may be modified to include a seal system as shown generally in FIG. 5, for example.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A fuel cell compressor system, comprising:
   a motor, including a motor shaft driven by the motor;
   a drive housing at least partially surrounding the motor shaft;
   a first gear set driven by the motor shaft;
   a carrier torque tube driven by the first gear set, the carrier torque tube configured to rotate at motor speed;
   a second gear set driven by the motor shaft, wherein the second gear set comprises a planet gear, a ring gear, and a sun gear; and an impeller, including an impeller shaft driven by the second gear set, the impeller shaft configured to rotate at a speed greater than motor speed.

2. A system in accordance with claim 1, including a first bearing disposed between the tube and the drive housing for at least partially supporting the tube, and a second bearing disposed between the impeller shaft and the tube for at least partially supporting the impeller shaft.

3. A system in accordance with claim 2, wherein the first bearing comprises a sealed greased bearing.

4. A system in accordance with claim 2, wherein the second bearing comprises a sealed greased bearing.

5. A system in accordance with claim 2, wherein the first bearing rotates at motor speed.

6. A system in accordance with claim 2, wherein the second bearing rotates at the difference between motor speed and impeller shaft speed.

7. A system in accordance with claim 1, wherein the first gear set comprises a spur gear or a planet gear carrier.

8. A system in accordance with claim 1, wherein the motor comprises a low-speed motor.

9. A fuel cell compressor system, comprising:
a motor, including a motor shaft driven by the motor;
a drive housing at least partially surrounding the motor shaft;
a first gear set driven by the motor shaft;
a carrier torque tube driven by the first gear set, the carrier torque tube configured to rotate at a first speed;
a first impeller driven by the carrier torque tube at a first speed for imparting fluid flow through a first stage of the system;
a second gear set driven by the motor shaft;
an impeller shaft driven by the second gear set, the impeller shaft configured to rotate at a second speed; and
a second impeller driven by the impeller shaft at a second speed for imparting fluid flow through a second stage of the system,
wherein the second gear set comprises a ring gear disposed between the impeller shaft and the drive housing.

10. A system in accordance with claim 9, including a first bearing disposed between the tube and the drive housing for at least partially supporting the tube, and a second bearing disposed between the impeller shaft and the tube for at least partially supporting the impeller shaft.

11. A system in accordance with claim 10, wherein the first bearing and second bearing include sealed greased bearings.

12. A system in accordance with claim 9, further comprising a clutch disposed between the drive housing and the ring gear.

13. A system in accordance with claim 12, wherein the clutch permits the ring gear to slip.

14. A system in accordance with claim 9, further comprising a diverter valve configured to allow fluid to bypass the second stage of the system.

15. A system in accordance with claim 9, wherein the second speed is greater than the first speed.

* * * * *